US012596735B2

(12) United States Patent
Takahashi et al.

(10) Patent No.: US 12,596,735 B2
(45) Date of Patent: Apr. 7, 2026

(54) SEMANTIC TEXT ANALYSIS FOR GLOSSARY MAINTENANCE

(71) Applicant: International Business Machines Corporation, Armonk, NY (US)

(72) Inventors: Toshihiro Takahashi, Nakano-ku (JP); Takaaki Tateishi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 18/638,365

(22) Filed: Apr. 17, 2024

(65) Prior Publication Data

US 2025/0328564 A1      Oct. 23, 2025

(51) Int. Cl.
| | |
|---|---|
| *G06F 16/334* | (2025.01) |
| *G06F 16/36* | (2019.01) |
| *G06F 40/242* | (2020.01) |
| *G06F 40/40* | (2020.01) |
| *G06N 5/022* | (2023.01) |
| *G06F 40/30* | (2020.01) |

(52) U.S. Cl.
CPC ........ *G06F 16/3344* (2019.01); *G06F 16/367* (2019.01); *G06F 40/242* (2020.01); *G06F 40/40* (2020.01); *G06N 5/022* (2013.01); *G06F 40/30* (2020.01)

(58) Field of Classification Search
None
See application file for complete search history.

(56) References Cited

U.S. PATENT DOCUMENTS

| | | | |
|---|---|---|---|
| 10,198,491 B1 | 2/2019 | Semturs et al. | |
| 11,366,966 B1 * | 6/2022 | Ramsey | G06F 40/295 |
| 11,487,708 B1 * | 11/2022 | Dangi | G06F 16/156 |
| 11,769,015 B2 * | 9/2023 | Travis | G06F 40/284 |
| | | | 704/9 |
| 2012/0239677 A1 * | 9/2012 | Neale | G06F 16/36 |
| | | | 707/769 |
| 2015/0186361 A1 * | 7/2015 | Su | G06F 40/45 |
| | | | 704/2 |

(Continued)

FOREIGN PATENT DOCUMENTS

CN           109271626 B      9/2023

OTHER PUBLICATIONS

Modeling Score Distributions for Combining the Outputs of Search Engines (Year: 2001).*

(Continued)

*Primary Examiner* — Kim T Nguyen
(74) *Attorney, Agent, or Firm* — Zilka-Kotab, P.C.

(57) ABSTRACT

A computer-implemented method (CIM), according to one embodiment, includes causing a first search to be performed on a first knowledge base for a first descriptive name, and extracting sentences from results of the first search. The method further includes running at least one predetermined deep learning model on the results of the first search for determining similarity scores for each of the extracted sentences, where each of the similarity scores defines a similarity score for an associated one of the extracted sentences and a first glossary. A first of the determined similarity scores is used to map terms of a second glossary to terms of the first glossary to enhance context provided in search results generated using the glossaries.

15 Claims, 6 Drawing Sheets

(56) References Cited

U.S. PATENT DOCUMENTS

| | | | | |
|---|---|---|---|---|
| 2019/0295158 A1* | 9/2019 | Wu | | H04W 4/029 |
| 2020/0134757 A1* | 4/2020 | Raphael | | G06F 16/9024 |
| 2021/0117617 A1* | 4/2021 | Blaya | | G06N 20/00 |
| 2022/0020288 A1* | 1/2022 | Naber | | G10L 15/187 |
| 2022/0230227 A1* | 7/2022 | Fan | | G01C 21/3694 |
| 2023/0004729 A1* | 1/2023 | Cushman, II | | G06F 40/18 |
| 2024/0046038 A1* | 2/2024 | Yoshida | | G06F 40/289 |
| 2025/0095351 A1* | 3/2025 | Shin | | G06V 20/40 |
| 2025/0217388 A1* | 7/2025 | Melbouci | | G06F 16/81 |
| 2025/0328564 A1* | 10/2025 | Takahashi | | G06F 40/40 |
| 2026/0023783 A1* | 1/2026 | Saha | | G06F 16/901 |

OTHER PUBLICATIONS

A Learning-Based Approach for Automatic Construction of Domain Glossary from Source Code and Documentation (Year: 1998).*

Matching of Descriptive Labels to Glossary Descriptions (Year: 2023).*

Takahashi et al., "Matching of Descriptive Labels to Glossary Descriptions," arXiv, 2023, 10 pages, retrieved from https://arxiv.org/abs/2310.18385.

Tsekouras et al., "A Graph-based Text Similarity Measure That Employs Named Entity Information," Proceedings of Recent Advances in Natural Language Processing, Sep. 2017, pp. 765-771.

Lobo et al., "Matching Table Metadata with Business Glossaries Using Large Language Models," arXiv, 2023, 13 pages, retrieved from https://arxiv.org/abs/2309.11506.

Anonymous, "Semantic Text Similarity Using Name Enrichment for Glossary Maintenance," Proceedings of 29th ACM SIGKDD Conference on Knowledge Discovery and Data Mining (KDD), 2023, pp. 1-9.

Jiang et al., "Improved Universal Sentence Embeddings with Prompt-based Contrastive Learning and Energy-based Learning," arXiv, 2022, 15 pages, retrieved from https://paperswithcode.com/paper/deep-continuous-prompt-for-contrastive-1/review/.

Wikidata, "Wikidata:Introduction," Wikidata, Jan. 2024, 3 pages, retrieved from https://www.wikidata.org/wiki/Wikidata:Introduction.

Wikipedia, "DBpedia," Wikipedia, 2024, 7 pages, retrieved from https://en.wikipedia.org/wiki/Dbpedia.

Coursera, "What Is Kaggle and What Is It Used For?" Coursera, Nov. 29, 2023, 11 pages, retrieved from https://www.coursera.org/articles/kaggle.

Ontotext, "What is a Knowledge Graph?" Ontotext Knowledge Hub, 2024, 8 pages, retrieved from https://www.ontotext.com/knowledgehub/fundamentals/what-is-a-knowledge-graph/.

Jiang, Y., "PromCSE: Improved Universal Sentence Embeddings with Prompt-based Contrastive Learning and Energy-based Learning," GitHub, 2022, 7 pages, retrieved from https://github.com/YJiangcm/PromCSE?tab=readme-ov-file#overview.

Wikipedia, "Semantics," Wikipedia, 2024, 38 pages, retrieved from https://en.wikipedia.org/wiki/Semantics.

Indoc.Pro, "Create a well crafted glossary for software documentation," indoc.pro, 2023, 4 pages, retrieved from https://indoc.pro/documentation-types/glossary/#What_is_a_glossary.

* cited by examiner

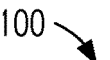

100

COMPUTER 101

PROCESSOR SET 110

PROCESSING CIRCUITRY 120        CACHE 121

COMMUNICATION FABRIC 111

VOLATILE MEMORY 112

PERSISTENT STORAGE 113

OPERATING SYSTEM 122

SEMANTIC TEXT ANALYSIS CODE

150

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

FIG. 1

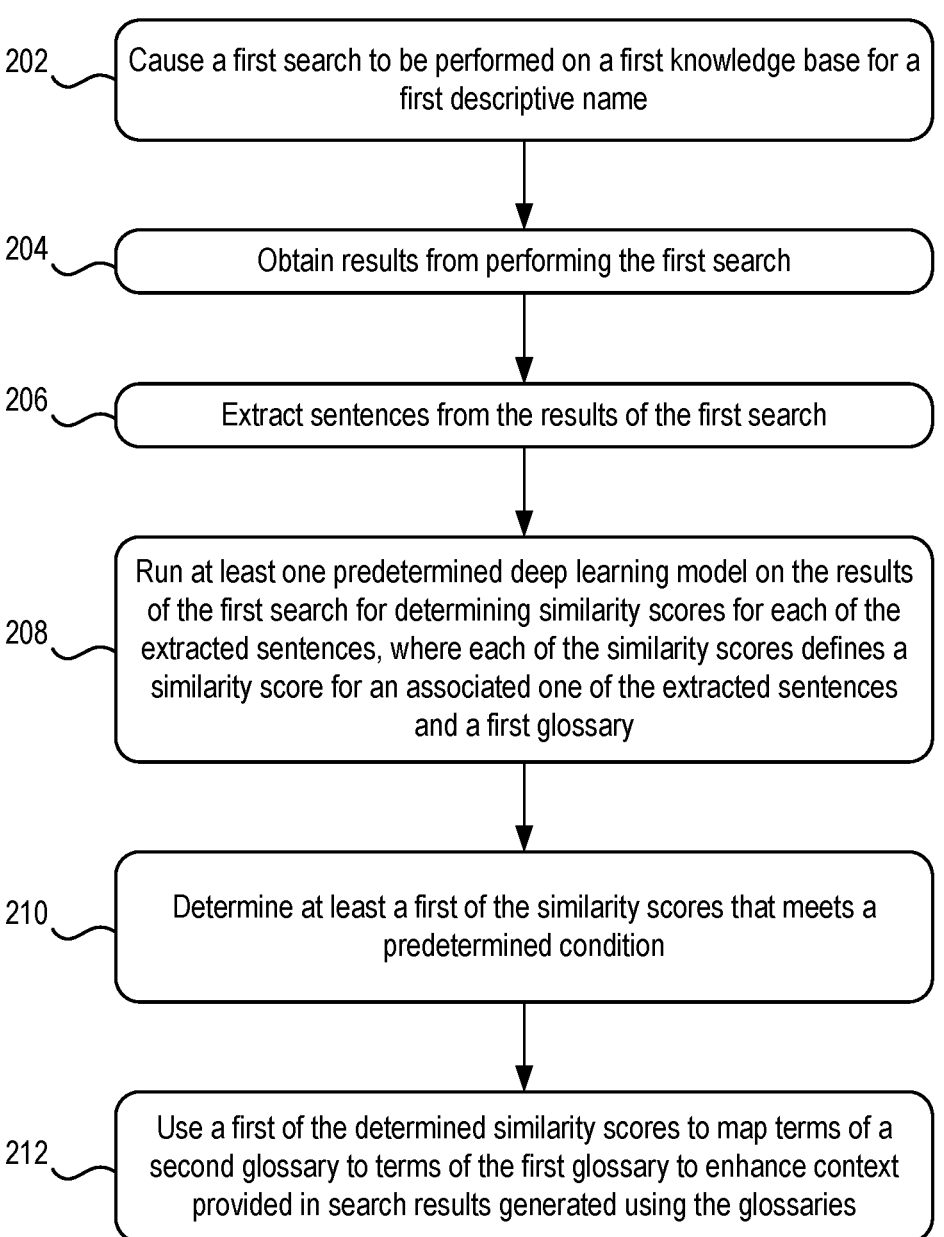

200

202 — Cause a first search to be performed on a first knowledge base for a first descriptive name 204 — Obtain results from performing the first search 206 — Extract sentences from the results of the first search 208 — Run at least one predetermined deep learning model on the results of the first search for determining similarity scores for each of the extracted sentences, where each of the similarity scores defines a similarity score for an associated one of the extracted sentences and a first glossary 210 — Determine at least a first of the similarity scores that meets a predetermined condition 212 — Use a first of the determined similarity scores to map terms of a second glossary to terms of the first glossary to enhance context provided in search results generated using the glossaries

FIG. 2

SEMANTIC TEXT ANALYSIS FOR GLOSSARY MAINTENANCE

BACKGROUND

The present invention relates to semantics, and more specifically, this invention relates to maintenance of glossaries.

Semantics is a topic within linguistics that defines meaning. Semantic text similarity plays a role in not only usual natural language processing applications but also software engineering tasks. Meanwhile, a glossary typically lists terms and defines the terms.

SUMMARY

A computer-implemented method (CIM), according to one embodiment, includes causing a first search to be performed on a first knowledge base for a first descriptive name, and extracting sentences from results of the first search. The method further includes running at least one predetermined deep learning model on the results of the first search for determining similarity scores for each of the extracted sentences, where each of the similarity scores defines a similarity score for an associated one of the extracted sentences and a first glossary. A first of the determined similarity scores is used to map terms of a second glossary to terms of the first glossary to enhance context provided in search results generated using the glossaries.

A computer program product (CPP), according to another embodiment, includes a set of one or more computer-readable storage media, and program instructions, collectively stored in the set of one or more storage media, for causing a processor set to perform the foregoing method.

A computer system (CS), according to another embodiment, includes a processor set, a set of one or more computer-readable storage media, and program instructions, collectively stored in the set of one or more storage media, for causing the processor set to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

FIG. 2 is a flowchart of a method, in accordance with one embodiment of the present invention.

DETAILED DESCRIPTION

Figure 3A:
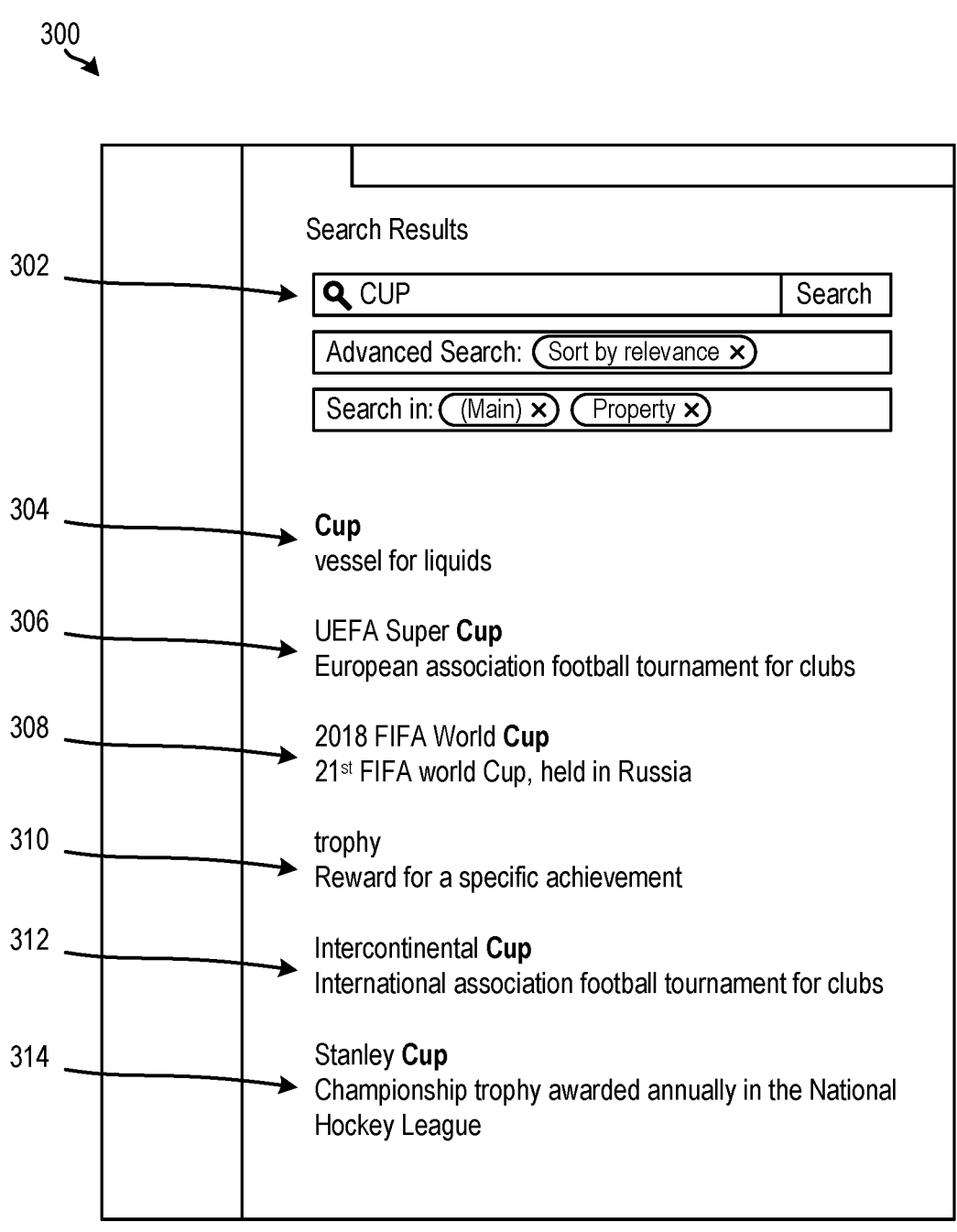
FIG. 3A depicts results of performing a search for a descriptive name on a knowledge base, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing semantic text analysis for maintaining a glossary.

In one general embodiment, a CIM includes causing a first search to be performed on a first knowledge base for a first descriptive name, and extracting sentences from results of the first search. The method further includes running at least one predetermined deep learning model on the results of the first search for determining similarity scores for each of the extracted sentences, where each of the similarity scores defines a similarity score for an associated one of the extracted sentences and a first glossary. A first of the determined similarity scores is used to map terms of a second glossary to terms of the first glossary to enhance context provided in search results generated using the glossaries.

In another general embodiment, a CPP includes a set of one or more computer-readable storage media, and program instructions, collectively stored in the set of one or more storage media, for causing a processor set to perform the foregoing method.

In another general embodiment, a CS includes a processor set, a set of one or more computer-readable storage media, and program instructions, collectively stored in the set of one or more storage media, for causing the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as semantic text analysis code of block 150 for performing semantic text analysis for maintaining a glossary. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere above, semantics is a topic within linguistics that defines meaning. Semantic text similarity plays a role in not only usual natural language processing applications but also software engineering tasks. Meanwhile, a glossary typically lists terms and defines the terms.

Using the techniques described herein enables semantic text similarity to play an important role in not only usual natural language processing applications, but also software engineering tasks which may request to clarify the semantics of descriptive names of artifacts such as business glossaries and table column names. These techniques may have a task of matching descriptive names with descriptions written in natural language. Conventional Bidirectional Encoder Representations from Transformers (BERT)-based methods cannot be relied on to achieve such a task due to descriptive names often being relatively too short and too generic. Accordingly, the terms of some conventional glossaries lack context and therefore, the defining such terms requires additional processing operations and computational loads.

In sharp contrast to the deficiencies described above, the techniques of embodiments and approaches described herein relatively enrich the descriptive names of glossaries with relevant sentences obtained from external knowledge sources. These techniques have the option of using Prompt-based Contrastive Learning for Sentence Embeddings (PromCSE), a state-of-the-art BERT-based implementation, and a traditional Term Frequency-Inverse Document Frequency (TF-IDF) based implementations as underlying semantic text similarity implementations. An evaluation is then performed with respect to two datasets. In some preferred approaches, one of these datasets may be a business glossary derived from the financial industry business ontology. Another of these datasets, in some approaches, includes a collection of column names and corresponding descriptions obtained from the data science competition platform webpages.

The novel techniques described above, according to some specific approaches, may be performed to understand the given descriptive names from column names in database, headers and categorical variables in a comma-separated values (CSV) formatted text file, etc. An external knowledge base, e.g., a knowledge graph, may be used to enrich a descriptive name with the entity's information extracted from the external knowledge base. To narrow down the candidate entities from the external knowledge base, these techniques estimate contexts of the set of descriptive names by using graph structure of the external knowledge base. For example, connected edges and entities from each candidate entity in the external knowledge base are collected. Major edges and entities which are connected to relatively more candidates than other edges and entities are collected, and the relatively major edges and entities are categorized as relatively "important context". Then, a TF-IDF like context score may be used to identify a top "N" number of important contexts that are then incorporated into glossaries.

A surprising result obtained during the testing of the techniques described herein includes the relative improvement of PromCSE and TF-IDF by 7.5% (Hits@ 10) on average.

Now referring to FIG. 2, a flowchart of a method 200 is shown according to one embodiment. The method 200 may be performed in accordance with aspects of the present invention in any of the environments depicted in FIGS.

1-3D, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

Operation 202 includes causing a first search to be performed on a first knowledge base. The search is preferably performed for at least a first descriptive name. For context, the first knowledge base may, in some approaches, be an external knowledge graph. More specifically, the first knowledge base may be an open and editable knowledge base accessible on the Internet, e.g., such as WIKIDATA, DBPedia, any type of external knowledge graph/source that would become apparent to one of ordinary skill in the art after reading the descriptions herein, etc. The search may be performed, in some approaches, by initiating a request via an application interface associated with the external knowledge graph, e.g., a search entry feature of the application interface associated with the external knowledge graph. In some other approaches, the external knowledge graph is searched by a component that is performing method 200, e.g., such as a computer, a processing circuit, etc.

In some approaches, the first search is performed in response to receiving a request for a query to be performed on the first descriptive name. The first descriptive name may be any type of word and any part of speech in a given language, e.g., "cup", "ball", "compute", etc. In some other approaches, the first descriptive name may additionally and/or alternatively be a column name in a database, a header in a comma-separated values (CSV) formatted text file, a categorical variable in a CSV formatted text file, etc.

As a result of causing the first search to be performed, results of the first search may be obtained, e.g., see operation 204. Sentences are extracted from results of the first search, e.g., see operation 206. A structure and/or form in which the results of the first search are arranged in, may depend on the approach. For example, in some approaches, the results of the first search include a text block that includes a plurality of sentences. In some other approaches, the results of the first search may include a plurality of sub-results that are sentences that are each associated with a different determined result, e.g., definitions of different terms that have at least a predetermined amount of similarity with the first descriptive name. Extraction of the sentences from the results of the first search may, in some approaches, be performed using natural language processing (NLP) techniques that would become apparent to one of ordinary skill in the art after reading the descriptions herein. For example, NLP processing may be performed, during which keywords and/or predetermined types of strings of words may be identified. For example, in some preferred approaches, the extracted sentences include a label associated with the first descriptive name and a description of the label that defines the label. Accordingly, an NLP engine may be configured to identify such parts of the results of performing the first search, and the identified parts may be extracted from the results of performing the first search.

In one illustrative approach, a search may be performed on a website associated with the first knowledge base. Results of this search may return several entities', e.g., Uniform Resource Identifier (URI) (i.e., Q12345, QXXXXX). Then, a "title" may be extracted (where the title contains several words and/or phrases), and furthermore, a "description" (which may contain a plurality of sentences defining the title) may be extracted from the entities returned from performing the search on the website. The "title" and "description" may be concatenated to generate a plurality of sentences, e.g., one sentence per associated pair of title and description.

Operation 208 includes running at least one predetermined deep learning model on the results of the first search for determining similarity scores for each of the extracted sentences. Each of the similarity scores preferably defines a similarity score for an associated one of the extracted sentences and a first glossary. The first glossary is, in some approaches, a financial industry business ontology.

In some preferred approaches, the determined similarity scores are semantic similarity scores in that each similarity score details, e.g., numerically characterize via a determined numerical value, a similarity that an associated extracted sentence has with one or more terms of the first glossary and/or definitions of the terms of the first glossary. Techniques for determining the similarity scores for the extracted sentences are detailed in several approaches below.

The predetermined deep learning model run on the results of the first search for determining similarity scores for each of the extracted sentences may, in some approaches, include a PromCSE model. For context, PromCSE is sentence embedding-based semantic text similarity model, in some approaches. This model may be used to compute a similarity score of given two sentences, e.g., similarity_score=PromCSE (sentenceA, sentenceB).

The predetermined deep learning model run on the results of the first search for determining similarity scores for each of the extracted sentences may, in some approaches, additionally and/or alternatively include a TF-IDF model. Similar to the PromCSE model described above, the TF-IDF model may be used to compute a similarity score between given two sentences, e.g., similarity_score_TFIDF (sentenceA, sentenceB).

In some approaches in which more than one of the deep learning models are run on the results of the first search, the similarity scores for each of the extracted sentences may be determined as an average of the output of the two or more models. For example, assuming that a PromCSE model and a TF-IDF model are run on the results of the first search, a similarity score determined by the PromCSE model for a first of the extracted sentences may be averaged with a similarity score determined by the TF-IDF model for the first extracted sentence, where the average is the determined similarity score for the first extracted sentence. In an alternative approach, assuming that a PromCSE model and a TF-IDF model are run on the results of the first search, determinations of the two models may be compared with one another to determine which of the models determines a relatively higher score for a given one of the sentences. In such approaches, the relatively highest score of the two models run is the max score, e.g., the determined similarity score for the first extracted sentence.

Operation 210 includes determining at least a first of the similarity scores from the determined similarity scores. In some preferred approaches, the first determined similarity score is determined based on the first determined similarity score meeting predetermined condition. In one or more of such approaches, the first determined similarity score has a relatively greater similarity score than the other determined similarity scores, e.g., max score. For example, assuming that four sentences are extracted, the similarity score may be determined as a max of PromCSE scores between the first glossary and the four extracted sentences. In other words, the determined similarity score may be determined as the result of the search, e.g., the extracted sentence, having a relatively closest correlation with a term of the first glossary (as indicated by the results of the predetermined deep learning model(s)). This way, as will be described below, an association, e.g., context, may be made between the first descriptive term and a term of the first glossary.

A first of the determined similarity scores is used to map terms of a second glossary to terms of the first glossary to enhance context provided in search results generated using the glossaries, e.g., see operation 212. More specifically, in some approaches, using the first determined similarity scores to map terms of the second glossary to terms of the first glossary may include mapping the label of the extracted sentence associated with the first determined similarity score to at least one of the terms of the second glossary. The term of the second glossary that the label of the extracted sentence associated with the first determined similarity score is mapped to preferably includes a term that also defines and/or is related to the first descriptive term. In some approaches, the term of the second glossary that the label of the extracted sentence associated with the first determined similarity score is mapped to includes a term that is determined to meet a predetermined condition. For example, method 200 may include running at least one predetermined deep learning model on the results of the first search for determining second similarity scores for each of the extracted sentences, where each of the second similarity scores defines a similarity score for an associated one of the extracted sentences and the second glossary. Thereafter, method 200 may include determining a second determined similarity score from the second similarity scores. The second determined similarity score has a relatively greater similarity score than the other second similarity scores (max score). The first determined similarity score and the second determined similarity score thereby serve as related entries with one another and with the first descriptive name. In other words, a relational context between the two glossaries may be established.

The relational context described above may be stored by establishing a mapping between the associated terms of the glossaries (terms associated with the first determined similarity score and the second determined similarity score) and thereafter used to provide context between the two glossaries. For example, in response to receiving, from a first device, a request for a second search to be performed on the at least one of the terms of the second glossary, method 200, in some approaches, includes causing the label of the extracted sentence associated with the first determined similarity score and/or the description of the label of the extracted sentence associated with the first determined similarity score to be returned to the first device. The mapping may, in some approaches, additionally and/or alternatively be established to cause any search thereafter performed on the first descriptive name to return the label of the extracted sentence associated with the first determined similarity score and/or the description of the label of the extracted sentence associated with the first determined similarity score. Furthermore, in some approaches, the mapping may additionally and/or alternatively be established to cause any search thereafter performed on the first descriptive name to return the label of the extracted sentence associated with the second determined similarity score and/or the description of the label of the extracted sentence associated with the second determined similarity score.

Figure 3B:
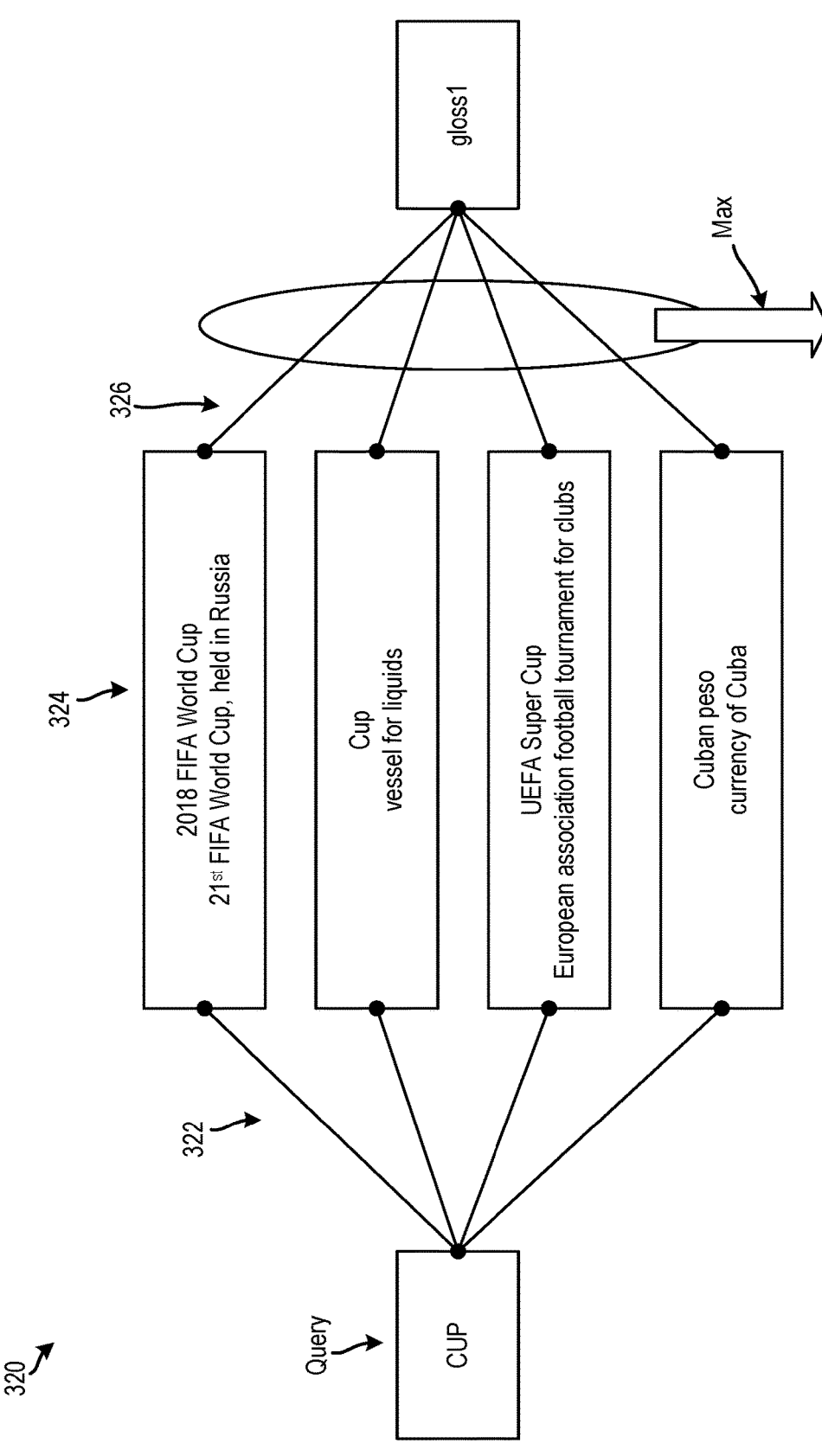
FIG. 3B depicts an overview of analyzing the results of performing the search in FIG. 3A, in accordance with one embodiment of the present invention.
Figure 3C:
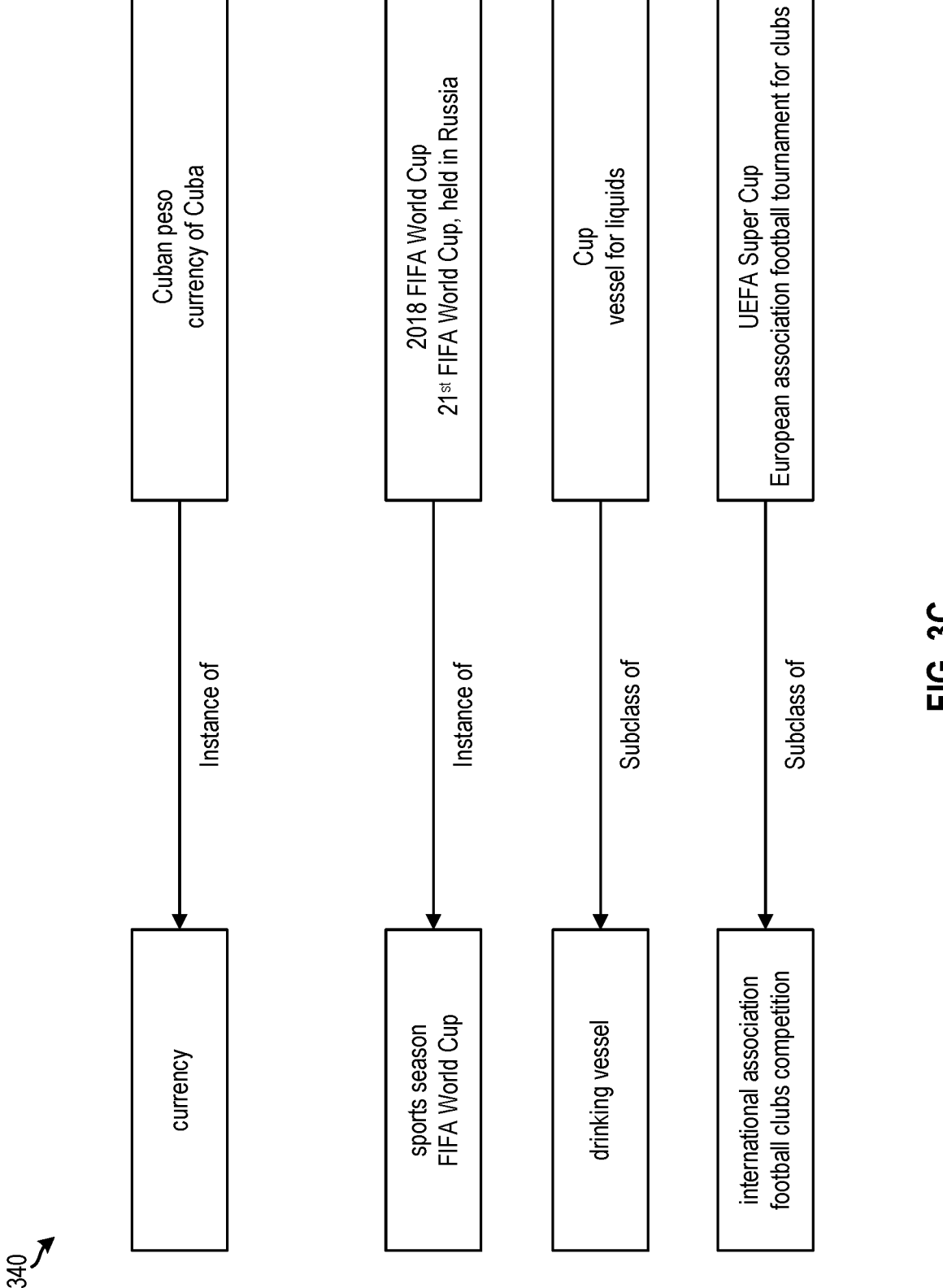
FIG. 3C depicts a list of search results, in accordance with one embodiment of the present invention.
Figure 3D:
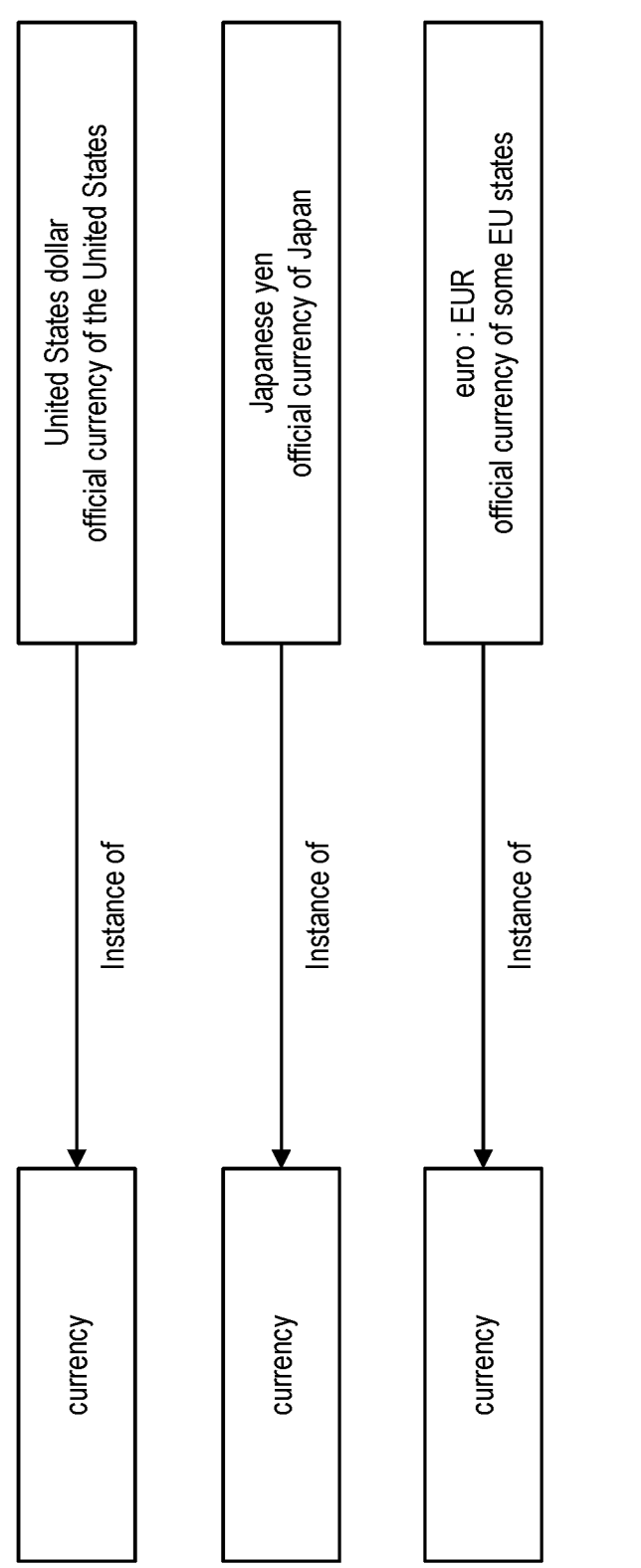
FIG. 3D depicts a list of search results, in accordance with one embodiment of the present invention.

FIGS. 3A-3D depict a progression of performing semantic text analysis for glossary maintenance, in accordance with several embodiments. Specifically, FIG. 3A depicts a window of a knowledge base 300 that a search for a descriptive name is performed on, in accordance with one embodiment of the present invention. FIG. 3B depicts an overview 320 of analyzing the results of performing the search in FIG. 3A, in accordance with one embodiment of the present invention. Furthermore, FIG. 3C depicts a list 340 of search results, in accordance with one embodiment of the present invention. Finally, FIG. 3D depicts a list 360 of search results, in accordance with one embodiment of the present invention. As an option, the present knowledge base 300, overview 320, list 340, and list 360 may be implemented in conjunction with features from any other embodiment listed herein, such as those described with reference to the other FIGS. Of course, however, such knowledge base 300, overview 320, list 340, and list 360 and others presented herein may be used in various applications and/or in permutations which may or may not be specifically described in the illustrative embodiments listed herein. Further, the knowledge base 300, overview 320, list 340, and list 360 presented herein may be used in any desired environment.

Referring now to FIG. 3A, results of performing a search for a descriptive name on the knowledge base 300 are illustrated in accordance with one embodiment of the present invention. For example, in response to receiving a query for the word (descriptive name) "CUP". A search is performed on the knowledge base 300, e.g., see search entry 302.

Results of performing the search include a plurality of returns, e.g., see first return 304, second return 306, third return 308, fourth return 310, fifth return 312, and sixth return 314. Each of these returns a label associated with the descriptive name "CUP". Furthermore, the returns include a description of the label that defines the label.

Referring now to FIG. 3B, in some approaches, overview 320 details an extraction of sentences from results of the search (the results of the search of FIG. 3A). In some approaches, results of performing the search on the knowledge base, e.g., see "Query" and search operation 322, are collected as entities in the form of sentences. These sentences preferably each include a label and description of the label from the search results. For example, four extracted sentences 324 are shown in FIG. 3B. The labels of the extracted sentences include: "2018 FIFA World Cup", "Cup", "UEFA Super Cup" and "Cuban peso", while the descriptions of the labels of the extracted sentences include: "21st FIFA World Cup, held in Russia", "vessel for liquids", "European association football tournament for clubs" and "currency of Cuba".

In some approaches, this extraction includes identification of major hypernym of given column names. In some approaches, the hypernym of each column name can be identified by using "knowledge base search" and "instance-of" relations in the knowledge base database, as follows:

Column name (CUP)→knowledge base search→entity (Q1234, QXXXX)→"instance-of"→hypernym (Currency, Sports season, . . . ).

Operation 326 includes computing a similarity score ('CUP', gloss1) as max of promCSE scores with respect to the four extracted sentences and a first glossary (see "gloss1"), e.g., see Max. This computing may include collecting connected edges and entities from each candidate entity in the knowledge graph, and finding major edges and entities which are connected to a plurality of candidates. A top "N" important contexts may then be identified by using a TF-IDF like context score.

In some approaches related to a financial dataset, a first and a second glossary may be used, e.g., a financial glossary such as a Financial Industry Business Ontology glossary and Knowledge Accelerator for Financial Services (KAFS by IBM). In some approaches, manual annotated mapping data (ground truth mapping) may exist between these two glossaries. Using the operative techniques described herein, e.g., see method 200, a corresponding KAFS glossary term may be identified in response to a FIBO term being given (and vice versa). In some approaches, this enables a corresponding column description to be identified when a column name is given.

Referring now to FIGS. 3C-3D, the list 340 and list 360 detail search results. In the list 340, mappings are established between glossary terms and descriptions that are enabled to be returned as a result of the mappings established herein. In other words, the results of a search that are performed are narrowed down by context provided by the mapping. Meanwhile, the list 360 includes other search results.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM), the CIM comprising:

causing a first search to be performed on a first knowledge base for a first descriptive name;

extracting sentences from results of the first search, wherein the extracted sentences include labels associated with the first descriptive name and descriptions of the labels;

running at least one predetermined deep learning model on the results of the first search for determining similarity scores for the extracted sentences, wherein each of the similarity scores defines a similarity score for an associated one of the extracted sentences and a first glossary;

determining a first of the determined similarity scores, wherein the first determined similarity score has a relatively greater similarity score than the other determined similarity scores; and using the first determined similarity score to map terms of a second glossary to terms of the first glossary to enhance context provided in search results generated using the glossaries.

2. The CIM of claim 1, wherein using the first determined similarity score to map terms of the second glossary to terms of the first glossary includes: mapping the label of the extracted sentence associated with the first determined similarity score to at least one of the terms of the second glossary, and comprising: in response to receiving, from a first device, a request for a second search to be performed on the at least one of the terms of the second glossary, causing the label of the extracted sentence associated with the first determined similarity score to be returned to the first device.

3. The CIM of claim 2, wherein the first glossary is a financial industry business ontology.

4. The CIM of claim 1, wherein the predetermined deep learning model run on the results of the first search is a Prompt-based Contrastive Learning for Sentence Embeddings (PromCSE) model.

5. The CIM of claim 4, wherein a second predetermined deep learning model is run on the results of the first search for determining the similarity scores for the extracted sentences, wherein the second predetermined deep learning model is a Term Frequency-Inverse Document Frequency (TF-IDF) model.

6. The CIM of claim 1, wherein the first descriptive name is selected from the group consisting of: a column name in a database, a header in a comma-separated values (CSV) formatted text file, and a categorical variable in a CSV formatted text file.

7. The CIM of claim 1, wherein the first knowledge base is an open and editable knowledge base accessible on the Internet.

8. A computer program product (CPP), the CPP comprising:

a set of one or more computer-readable storage media; and program instructions, collectively stored in the set of one or more computer-readable storage media, for causing a processor set to perform the following computer operations:

cause a first search to be performed on a first knowledge base for a first descriptive name;

extract sentences from results of the first search, wherein the extracted sentences include labels associated with the first descriptive name and descriptions of the labels;

run at least one predetermined deep learning model on the results of the first search for determining similarity scores for the extracted sentences, wherein each of the similarity scores defines a similarity score for an associated one of the extracted sentences and a first glossary;

determine a first of the determined similarity scores, wherein the first determined similarity score has a relatively greater similarity score than the other determined similarity scores; and use the first determined similarity score to map terms of a second glossary to terms of the first glossary to enhance context provided in search results generated using the glossaries.

9. The CPP of claim 8, wherein using the first determined similarity score to map terms of the second glossary to terms of the first glossary includes: mapping the label of the extracted sentence associated with the first determined similarity score to at least one of the terms of the second glossary, and the CPP comprising: program instructions, collectively stored in the set of one or more storage media, for causing the processor set to perform the following computer operations: in response to receiving, from a first device, a request for a second search to be performed on the at least one of the terms of the second glossary, cause the label of the extracted sentence associated with the first determined similarity score to be returned to the first device.

10. The CPP of claim 9, wherein the first glossary is a financial industry business ontology.

11. The CPP of claim 8, wherein the predetermined deep learning model run on the results of the first search is a Prompt-based Contrastive Learning for Sentence Embeddings (PromCSE) model.

12. The CPP of claim 11, wherein a second predetermined deep learning model is run on the results of the first search for determining the similarity scores for the extracted sentences, wherein the second predetermined deep learning model is a Term Frequency-Inverse Document Frequency (TF-IDF) model.

13. The CPP of claim 8, wherein the first descriptive name is selected from the group consisting of: a column name in a database, a header in a comma-separated values (CSV) formatted text file, and a categorical variable in a CSV formatted text file.

14. The CPP of claim 8, wherein the first knowledge base is an open and editable knowledge base accessible on the Internet.

15. A computer system (CS), the CS comprising:

a processor set;

a set of one or more computer-readable storage media;

program instructions, collectively stored in the set of one or more storage media, for causing the processor set to perform the following computer operations:

cause a first search to be performed on a first knowledge base for a first descriptive name;

extract sentences from results of the first search, wherein the extracted sentences include labels associated with the first descriptive name and descriptions of the labels;

run at least one predetermined deep learning model on the results of the first search for determining similarity scores for the extracted sentences, wherein each of the similarity scores defines a similarity score for an associated one of the extracted sentences and a first glossary;

determine a first of the determined similarity scores, wherein the first determined similarity score has a relatively greater similarity score than the other determined similarity scores; and use the first determined similarity score to map terms of a second glossary to terms of the first glossary to enhance context provided in search results generated using the glossaries.

* * * * *